US012715393B2

(12) United States Patent
Paradis et al.

(10) Patent No.: US 12,715,393 B2
(45) Date of Patent: Aug. 25, 2026

(54) EXTERIOR LIGHTING CONTROL SYSTEMS FOR VEHICLES

(71) Applicant: Toyota Motor Engineering & Manufacturing North America, Inc., Plano, TX (US)

(72) Inventors: Alexander L. Paradis, Ann Arbor, MI (US); Frank A. Richards, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 741 days.

(21) Appl. No.: 17/735,356

(22) Filed: May 3, 2022

(65) Prior Publication Data

US 2023/0356690 A1 Nov. 9, 2023

(51) Int. Cl.

*B60R 25/01* (2013.01)
*B60R 25/24* (2013.01)
*B60R 25/30* (2013.01)
*B60R 25/34* (2013.01)
*B60R 1/074* (2006.01)

(52) U.S. Cl.

CPC .............. *B60R 25/01* (2013.01); *B60R 25/24* (2013.01); *B60R 25/305* (2013.01); *B60R 25/34* (2013.01); *B60R 1/074* (2013.01); *B60R 2325/205* (2013.01)

(58) Field of Classification Search

CPC ....... B60R 25/01; B60R 25/24; B60R 25/305; B60R 25/34; B60R 1/074; B60R 2325/205

See application file for complete search history.

(56) References Cited

U.S. PATENT DOCUMENTS 4,893,916 A * 1/1990 Sakuma .................. B60R 1/074 248/478
5,719,552 A * 2/1998 Thompson ............. B60Q 1/305 200/61.04
8,764,256 B2 * 7/2014 Foote ....................... B60Q 1/22 362/545
8,922,388 B2 * 12/2014 Nykerk ................ B60Q 1/0023 340/901

(Continued)

FOREIGN PATENT DOCUMENTS

CN 105864705 A * 8/2016 ............. B60Q 1/326
DE 102017116917 A1 * 2/2018 ............. B62D 25/12

(Continued)

OTHER PUBLICATIONS

"Focker, Felix; Houdek, Frank; Daun, Marian; Weyer, Thorsten; Model-based engineering of an automotive adaptive exterior lighting system: Realistic example specifications of behavioral requirements and functional design; Jan. 2015; ICB-Research Report, No. 64, Universität Duisburg-Essen" (Year: 2015).*

*Primary Examiner* — Ramya P Burgess
*Assistant Examiner* — Christopher R Cardimino
(74) *Attorney, Agent, or Firm* — Dinsmore & Shohl LLP

(57) ABSTRACT

A vehicle includes a lighting control system including a sensor that is located at an exterior movable component of the vehicle. When the exterior movable component is moved from one position to another position, the pressure sensor sends a signal to a controller that activates exterior lights of the vehicle based on the signal.

10 Claims, 5 Drawing Sheets

(56) References Cited

U.S. PATENT DOCUMENTS 9,646,436 B1 5/2017 Campbell et al.
9,870,701 B2 1/2018 Lee
10,040,392 B2 * 8/2018 Salter ..................... B60Q 1/381
10,072,453 B2 * 9/2018 Ihlenburg ................ E05F 15/40
10,112,527 B2 * 10/2018 Snider ..................... F21S 43/31
10,220,704 B2 * 3/2019 Machak ............... G05B 19/048
12,286,056 B2 * 4/2025 Pasquarelli .......... G02B 6/0046
2002/0180233 A1 * 12/2002 Benthaus .............. E05F 1/1091 296/76
2007/0171057 A1 * 7/2007 Ogino ..................... E05B 81/78 340/545.7
2009/0273941 A1 * 11/2009 Englander .............. B60Q 1/324 362/494
2011/0115375 A1 * 5/2011 Shiratsuchi ............ B60Q 1/247 315/77
2011/0260848 A1 * 10/2011 Rodriguez Barros . B60Q 1/324 340/438
2014/0169139 A1 6/2014 Lee
2014/0312650 A1 * 10/2014 Maruyama ............... B60J 5/047 296/146.9
2017/0120932 A1 5/2017 Szczerba et al.
2021/0129741 A1 5/2021 Cha et al.
2023/0212891 A1 * 7/2023 Ishii ........................ E05B 81/56 292/336.3

FOREIGN PATENT DOCUMENTS

DE 102017121606 B3 9/2018
IN 201641022867 A 5/2018
JP 2001270385 A * 10/2001
JP 4973944 B2 7/2012
KR 20040097634 A * 11/2004
KR 200389090 Y1 7/2005
KR 20200128285 A * 11/2020 ............... B60R 1/04
WO 2009150509 A1 12/2009

* cited by examiner 73
60
20
71
60
70

EXTERIOR LIGHTING CONTROL SYSTEMS FOR VEHICLES

TECHNICAL FIELD

The present specification generally relates to lighting systems for vehicles and, in particular lighting control systems that activate exterior lighting using exterior vehicle component movement.

BACKGROUND

Exterior lights of a vehicle are typically controlled by actuating a switch located inside the vehicle. For example, a knob may be provided at a steering wheel that can be turned to activate the exterior lights and control the brightness. In some vehicles, a sensor may be provided that detects ambient light and is used by the vehicle electronic control unit to automatically control the exterior lights when the vehicle is in operation. Typically, to control the exterior lights, a user must be inside the vehicle.

Accordingly, a need exists to provide lighting control systems that allow a user to activate the exterior lights from outside the vehicle.

SUMMARY

In one embodiment, a vehicle includes a lighting control system including a sensor that is located at an exterior movable component of the vehicle. When the exterior movable component is moved from one position to another position, the sensor sends a signal to a controller that activates exterior lights of the vehicle based on the signal.

In another embodiment, a method of controlling exterior lights of a vehicle is provided. The method includes moving an exterior movable component of the vehicle from an initial position to a moved position and detecting when the exterior movable component is in the moved position using a sensor. The sensor sends a signal to a controller. The controller activates the exterior lights in response to the signal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicle lighting control systems that include a sensor that is located at an exterior movable component of a vehicle, such as a rearview side mirror, hood, window, fuel cap, tailgate, etc. When the exterior movable component is moved from one position to another position, the sensor is engaged and sends a signal to a controller that activates exterior lighting based on the signal. The vehicle lighting control systems may also authenticate a user before activating exterior lighting. The user may be authenticated using a key fob, smartphone (e.g., using a virtual key), facial recognition, etc.

Figure 1:
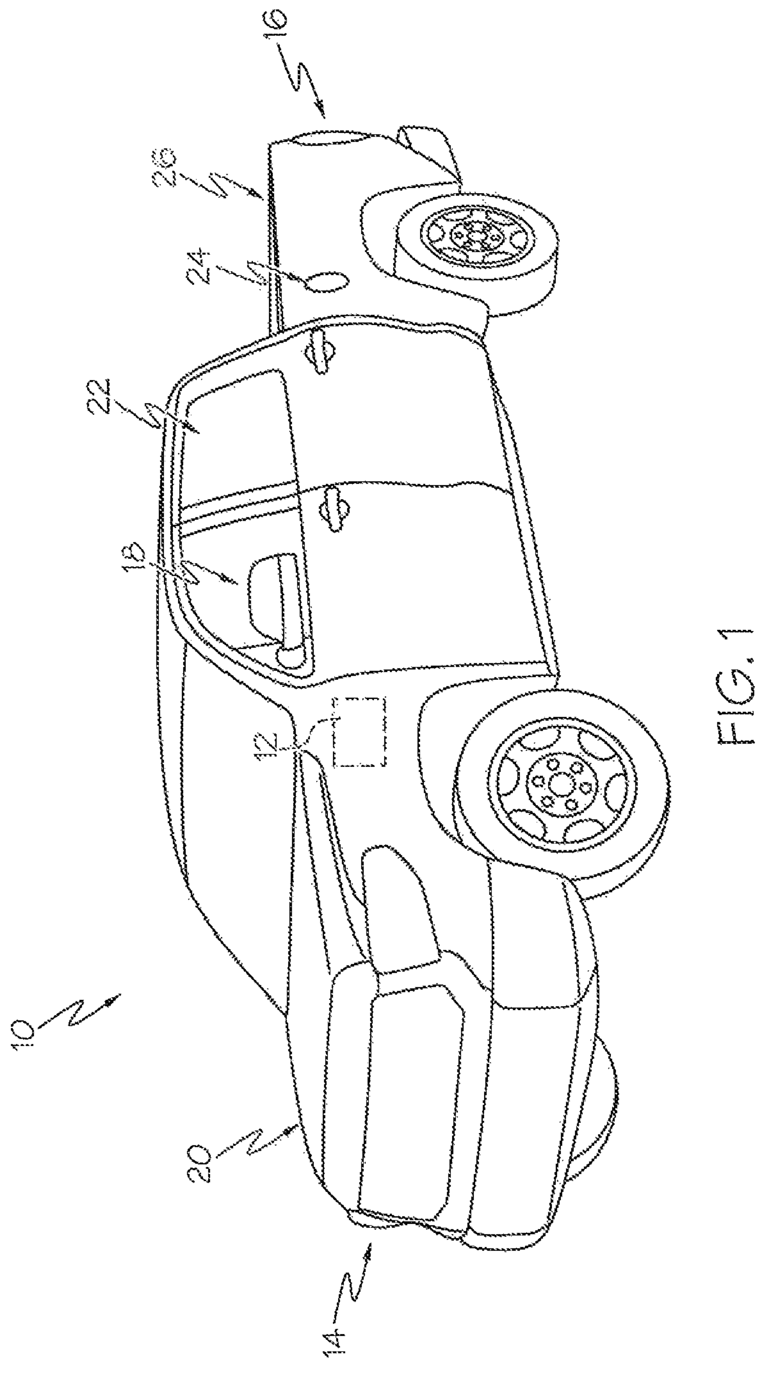
FIG. 1 depicts a vehicle including a vehicle lighting control system for controlling exterior lights based on movement, according to one or more embodiments shown and described herein.

Referring to FIG. 1, a vehicle 10 is illustrated that includes a lighting control system 12 for use in controlling exterior lights 14 and 16 of the vehicle 10. While a truck is shown, it is noted that the present disclosure may be applied to any vehicle. It is contemplated that the vehicle may or may not be an autonomous vehicle or a partially autonomous vehicle. The vehicle 10 includes various exterior movable components. Sensors may be located at the moveable components and can be used by a controller (FIG. 3) to detect movement of the moveable component. As examples, the vehicle 10 includes a side mirror 18, a hood 20, a window 22, a fuel cap 24 and a tailgate 26 that can be physically moved by a user from an initial position to a moved position. Such movement of the movable components 18, 20, 22, 24 and 26 can be detected by the sensors, which provide a signal to a controller, such as a vehicle electronic control unit (ECU) that can be used to control activation of the exterior lights 14 and 16. Illumination settings, such as intensity, color, timing, etc., can also be controlled by the ECU.

Figure 2B:
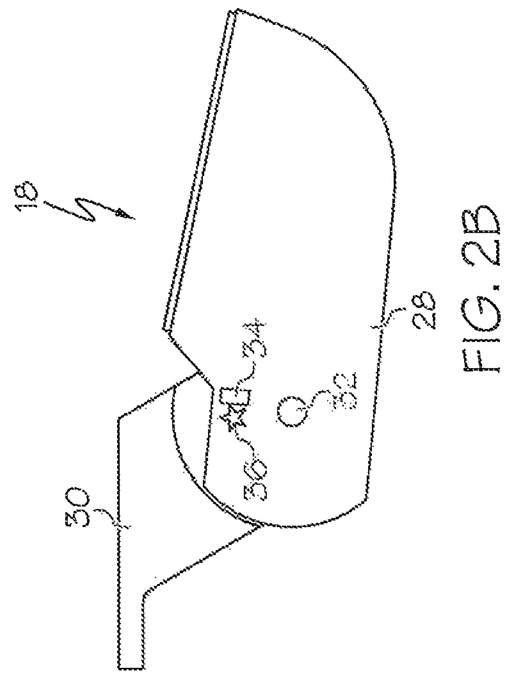
FIG. 2B depicts the vehicle component of FIG. 2A moved from an initial position to a moved position, according to one or more embodiments shown and described herein.
Figure 2A:
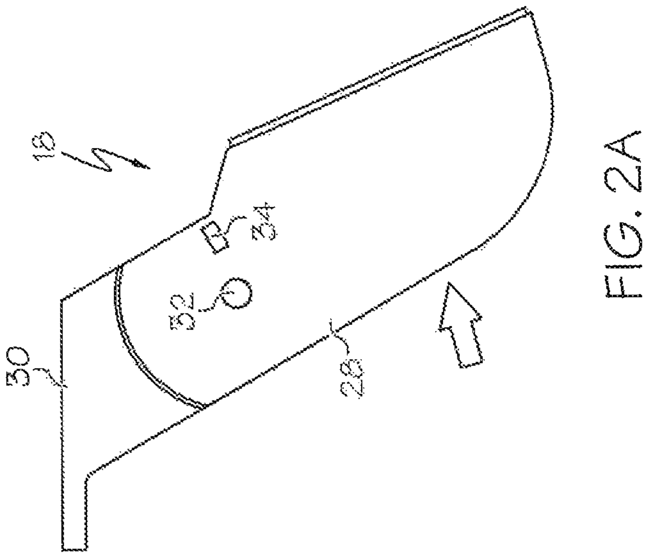
FIG. 2A depicts a vehicle component with a sensor, according to one or more embodiments shown and described herein.

Referring to FIGS. 2A and 2B, for example, the side mirror 18 is illustrated in an initial position (FIG. 2A) and a moved position (FIG. 2B). The side mirror 18 includes a mirror housing 28 that is pivotally connected to a mount 30 at a pivot location 32. In this example, the mirror housing 28 includes a sensor 34 (e.g., a proximity or pressure sensor) that provides a signal to the controller when the mirror housing 28 is moved from the initial position to the moved position. For example, the sensor 34 may be a pressure sensor that contacts a portion 36 of the mount 30 when the mirror housing 28 is moved from the initial position to the moved position. The sensor may be any suitable sensor, such as pressure sensors, proximity sensors, etc.

Figure 3:
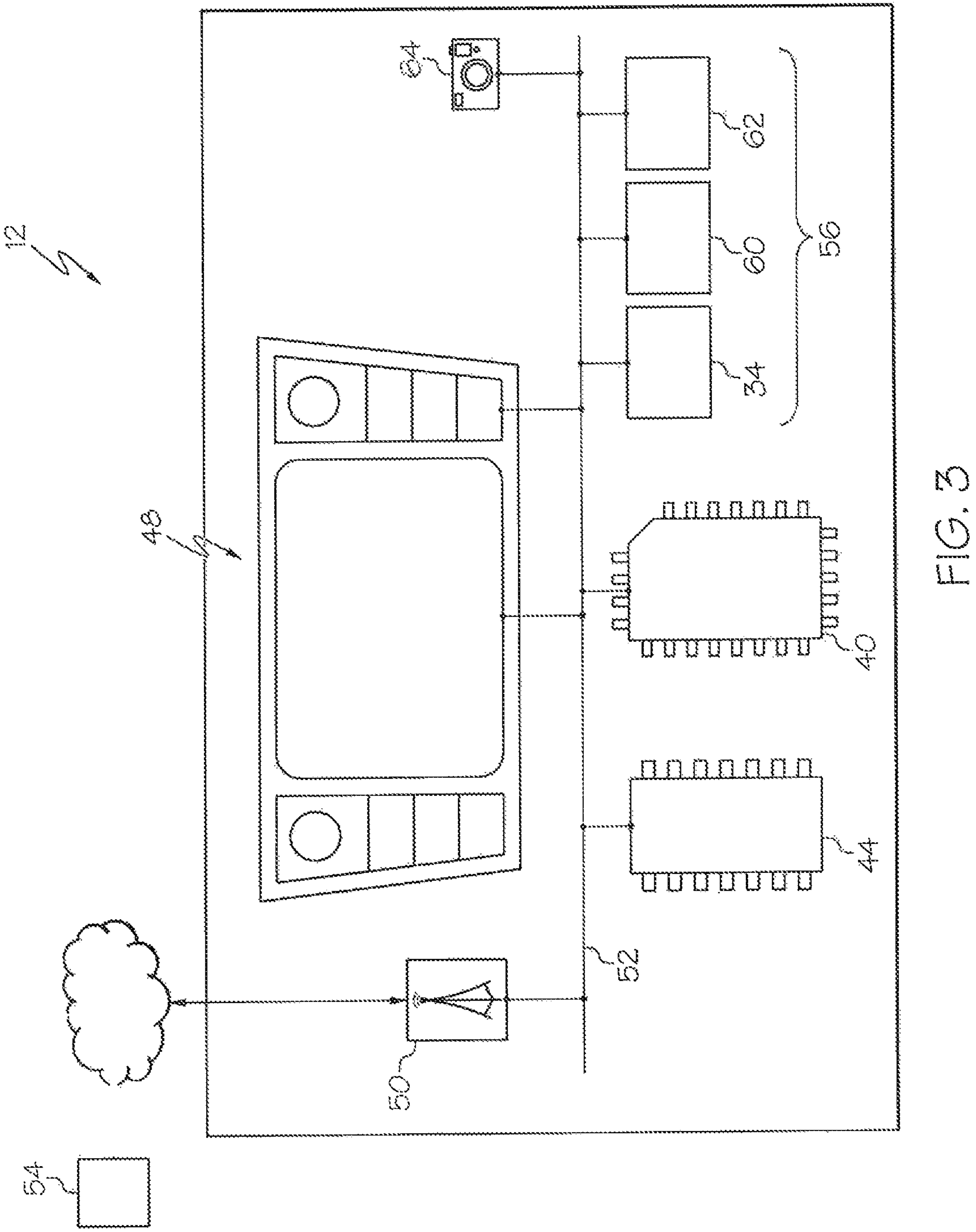
FIG. 3 schematically depicts a lighting control system for use in the vehicle of FIG. 1, according to one or more embodiments shown and described herein.

Referring to FIG. 3, the vehicle 10 includes the lighting control system 12 that utilizes sensors to detect movement of one or more of the movable components 18, 20, 22, 24 and 26. The lighting control system 12 includes one or more processors 40. Each one or more processor 40 may be any device capable of executing machine readable instructions. Accordingly, each one or more processor 40 may be a controller, an integrated circuit, a microchip, a computer, or any other computing device. The one or more processors 40 are coupled to a communication path 52 that provides signal interconnectivity between various modules. Accordingly, the communication path 52 may communicatively couple any number of processors 40 with one another, and allow the modules coupled to the communication path 52 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 52 may be formed from any medium that is capable of transmitting a signal such as, for example, conductive wires, conductive traces, optical waveguides, or the like. In some embodiments, the communication path 52 may facilitate the transmission of wireless signals, such as WiFi, Bluetooth, and the like. Moreover, the communication path 52 may be formed from a combination of mediums capable of transmitting signals. In one embodiment, the communication path 52 comprises a combination of conductive traces, conductive wires, connectors, and buses that cooperate to permit the transmission of electrical data signals to components such as processors, memories, sensors, input devices, output devices, and communication devices. Accordingly, the communication path 52 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle 10 further includes one or more memory modules 44 coupled to the communication path 52. The one or more memory modules 44 may comprise RAM, ROM, flash memories, hard drives, or any device capable of storing machine readable instructions such that the machine readable instructions can be accessed by the one or more processors 40. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 44. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components.

In some embodiments, the one or more memory modules 44 may include a database that includes logic for detecting an authorized person. For example, the one or more memory modules 44 may include a facial recognition database or algorithm to allow the vehicle 10 to identify a person within a vicinity of the vehicle 10. The lighting control system 12 may allow or disallow activation of the exterior lights 14 and 16 depending on whether or not the person is recognized as an authorized person.

The vehicle 10 comprises a display 48 for providing visual output such as, for example, maps, navigation, entertainment, information, or a combination thereof. The display 48 is coupled to the communication path 52, as shown in FIG. 3. Accordingly, the communication path 52 communicatively couples the display 48 to other modules of the vehicle 10. The display 48 may include any medium capable of transmitting an optical output such as, for example, a cathode ray tube, light emitting diodes, a liquid crystal display, a plasma display, or the like. Moreover, the display 48 may be a touch screen that, in addition to providing optical information, detects the presence and location of a tactile input upon a surface of or adjacent to the display 48. Accordingly, the display 48 may receive mechanical input directly upon the optical output provided by the display 48. The display 48 can be used to control operation of the lighting control system 12. It is noted that the display 48 can include at least one of the one or more processors 40 and the one or memory modules 44. The display 48 can be at least one of a heads-up display, an instrument cluster display, and a mobile device display. In some embodiments, the vehicle 10 may have a plurality of displays. In such embodiments, the vehicle 10 can also have a plurality of different types of displays at various locations within the vehicle 10. For example, and not as a limitation, the vehicle 10 can have an in-dashboard display and a heads-up display for displaying information directly on a windshield or window of the vehicle 10.

In some embodiments, the vehicle 10 comprises network interface module 50 for communicatively coupling the vehicle 10 to a network. The network interface module 50 can be communicatively coupled to the communication path 52 and can be any device capable of transmitting and/or receiving data via the network. Accordingly, the network interface module 50 can include a communication transceiver for sending and/or receiving any wired or wireless communication. For example, the network interface module 50 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface module 50 includes hardware configured to operate in accordance with the Bluetooth wireless communication protocol. In another embodiment, network interface module 50 may include a Bluetooth send/receive module for sending and receiving Bluetooth communications to/from a mobile device 54 (e.g., a smartphone including a virtual key) for controlling operation of the lighting control system 12.

The vehicle 10 may include one or more sensors, generally referenced as element 56, communicatively coupled to the one or more processors 40. The one or more sensors 56 may include, but are not limited to, cameras, LiDAR, RADAR, proximity sensors, pressure sensors, etc. In some embodiments, multiple types of sensors are used to provide a variety of information to the vehicle 10.

For instance, FIG. 3 illustrates the vehicle 10 utilizing a variety of sensors 34, 60, 62. A camera 64 may be coupled to the communication path 52 such that the communication path 52 communicatively couples the camera 64 to other modules of the vehicle 10. The camera 64 may be any device having an array of sensing devices (e.g., pixels) capable of detecting radiation in an ultraviolet wavelength band, a visible light wavelength band, or an infrared wavelength band. The camera 64 may have any suitable resolution. Some embodiments may include multiple cameras. In operation, the camera 64 may be used by the processor 40 to determine whether a person within a vicinity of the vehicle 10 is authorized to control the lighting control system 12. The camera 64 and/or the one or more processors 40, based on input from the camera 64, may be able to also determine the type of objects the camera 64 is capturing through image recognition capabilities. In some embodiments, the processor 40 may use a key fob or smartphone, both represented by element 54 to authenticate a user.

Still referring to FIG. 3, the vehicle 10 may further include another sensor or sensors 34 in addition to the camera 64. The sensor 34 is coupled to the communication path 52 such that the communication path 52 communicatively couples the sensor 34 to other modules of the vehicle 10. The sensor 34 may be any device capable of outputting a signal indicative of the movement of the vehicle component, such as the mirror 18.

Figure 4:
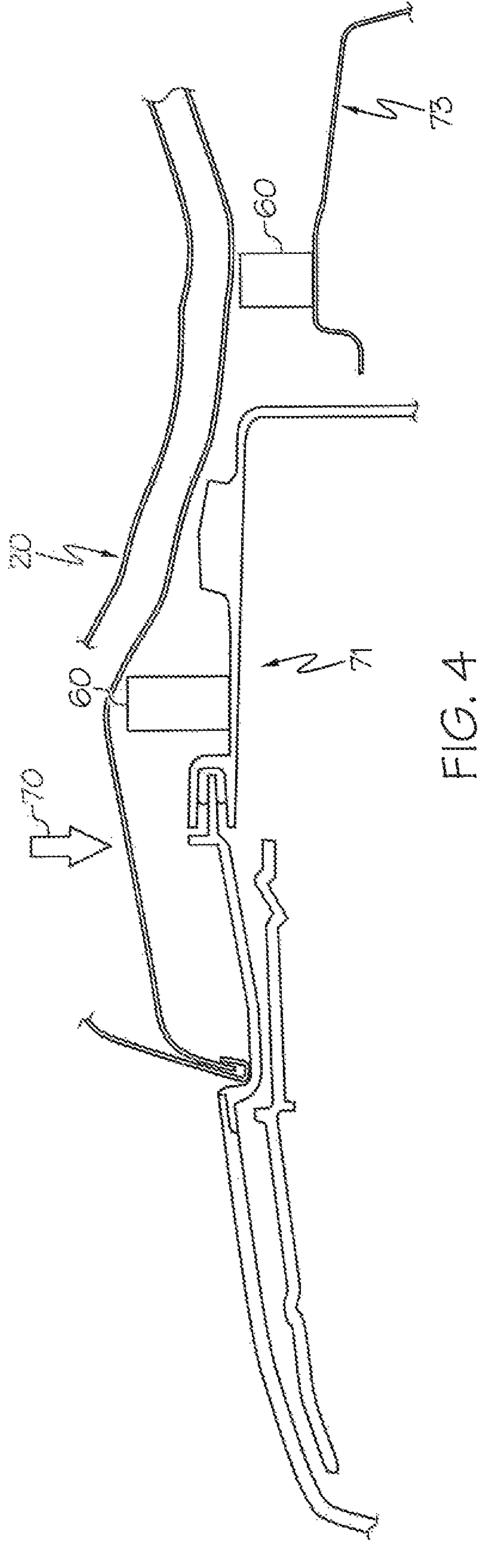
FIG. 4 depicts another vehicle component and a sensor for controlling activation of exterior lights, according to one or more embodiments shown and described herein.

Referring to FIG. 4, the vehicle may include the sensor 60 located at the hood 20 (e.g., engine compartment or trunk). In the illustrated example, sensors 60 may be located on a headlamp support structure 71 and/or a radiator support structure 73, or any other suitable structure. As represented by the arrow 70, when the authorized user pushes down on the hood 20, the hood 20 is configured to move toward the sensor 60, close a gap between the sensor 60 and the hood 20, and contact the sensor 60. The sensor 60 is configured to detect this movement of/contact with the hood 20 and provide a signal to the controller, as described above. The controller, in response to the signal, then activates the exterior lights 14 and 16 if the user is authenticated.

Figure 5:
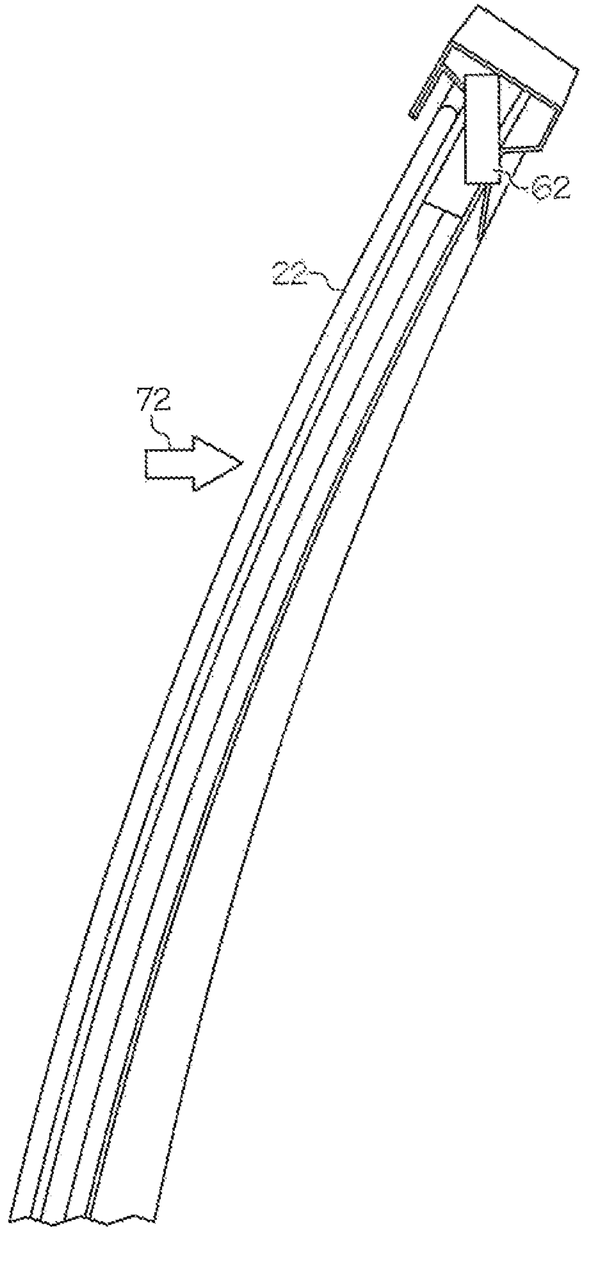
FIG. 5 depicts another vehicle component and a sensor for controlling activation of exterior lights, according to one or more embodiments shown and described herein.

Referring to FIG. 5, the sensor 62 is located at the window 22 of a door assembly. As represented by the arrow 72, when the authorized user presses the window 22, the window 22 is configured to move toward the sensor 62, close a gap between the sensor and the window 22, and contact the sensor 62. The sensor 62 is configured to detect this movement of/contact with the window 22 and provide a signal to the controller, as described above. The controller, in response to the signal, then activates the exterior lights 14 and 16 if the user is authenticated.

The above-described lighting control systems utilize sensors to detect a physical movement of a vehicle component and then activate exterior lights in response to a signal from the sensors. The vehicle lighting systems can be used by a user of the vehicle when located outside of the cabin of the vehicle in order to improve lighting in the surrounding environment, for example. This improved lighting can aid the user to see when they need the lights activated from outside the vehicle, such as when setting up a campsite. The lighting control systems may also utilize image recognition to detect when a user is authorized. Such an arrangement can prevent unauthorized users from activating the exterior lights.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:

a lighting control system comprising a sensor that is located at an exterior movable component of the vehicle, the exterior moveable component comprising a window of a door assembly;

wherein, when the window is moved inward, the window is configured to move toward the sensor, the sensor arranged and configured to detect the window when the window contacts the sensor and to send a signal to a controller that activates exterior lights of the vehicle based on the signal when the window is detected.

2. The vehicle of claim 1, wherein the sensor is a pressure sensor.

3. The vehicle of claim 1, wherein the sensor is located in a door assembly comprising the window and the sensor is a pressure sensor configured to contact the window when the window is moved from one position to another position.

4. The vehicle of claim 1, wherein the lighting control system comprising a memory that includes image recognition logic, the controller configured to identify whether a user is an authorized user using the image recognition logic.

5. The vehicle of claim 1, wherein the controller is configured to identify whether a user is an authorized user using a one or both of a key fob or mobile computing device that provides a signal to the controller.

6. A method of controlling exterior lights of a vehicle, the method comprising:

moving a window of the vehicle inward toward a sensor from an initial position to a moved position;

detecting when the window is in the moved position using the sensor and sending a signal to a controller, the sensor arranged and configured to detect the window when the window is moved to the moved position; and the controller activating the exterior lights in response to the signal.

7. The method of claim 6 further comprising the controller determining whether a user is an authorized user using image recognition before the step of activating the exterior lights.

8. The method of claim 6 further comprising the controller determining whether a user is an authorized user using a signal from a key fob that provides a signal to the controller before the step of activating the exterior lights.

9. The method of claim 6, wherein the sensor is a pressure sensor.

10. The method of claim 6 wherein the sensor is a pressure sensor configured to contact the window when the window is moved from the initial position to the moved position.

* * * * *